Dec. 18, 1945.  W. L. MORRISON  2,391,030
REFRIGERATING APPARATUS.
Filed Dec. 15, 1941  2 Sheets-Sheet 1
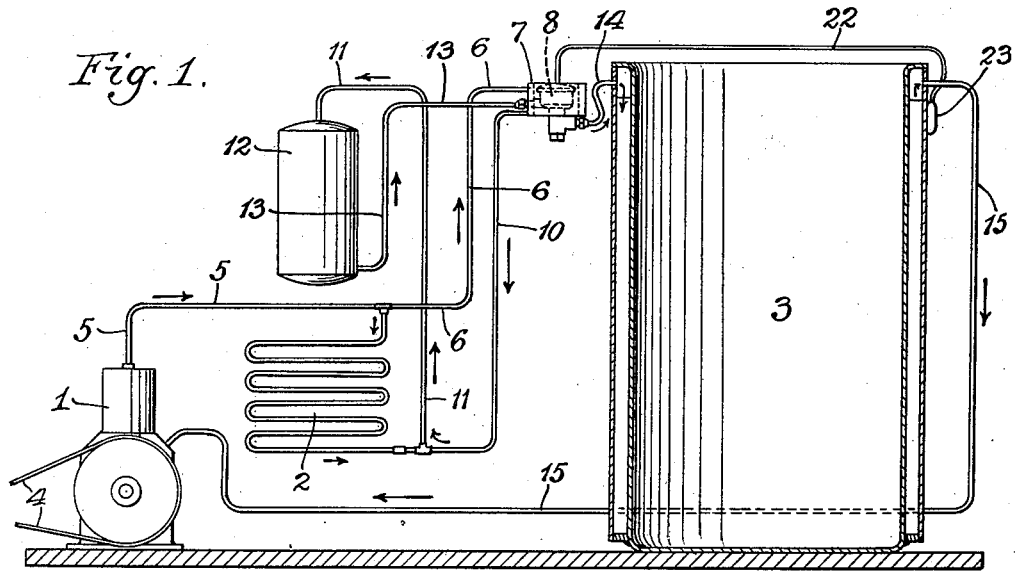
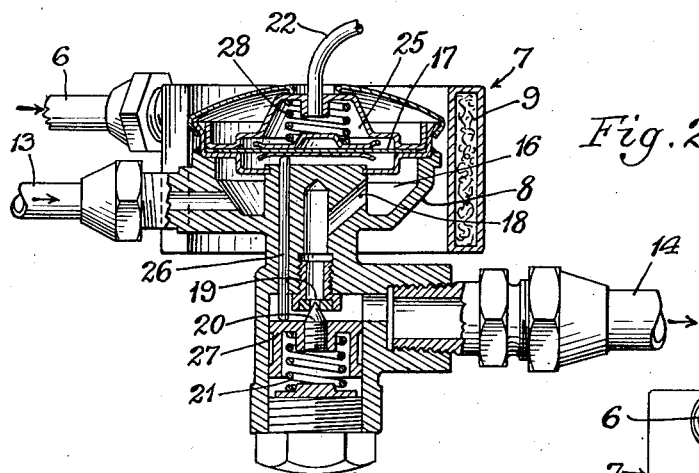
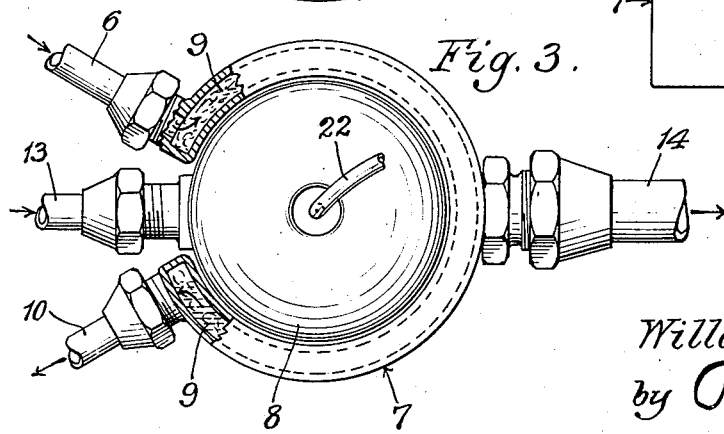
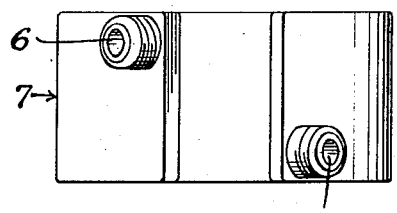
Inventor
Willard L. Morrison
by Parker & Carter
Attorneys.

Dec. 18, 1945.    W. L. MORRISON    2,391,030
REFRIGERATING APPARATUS
Filed Dec. 15, 1941    2 Sheets-Sheet 2
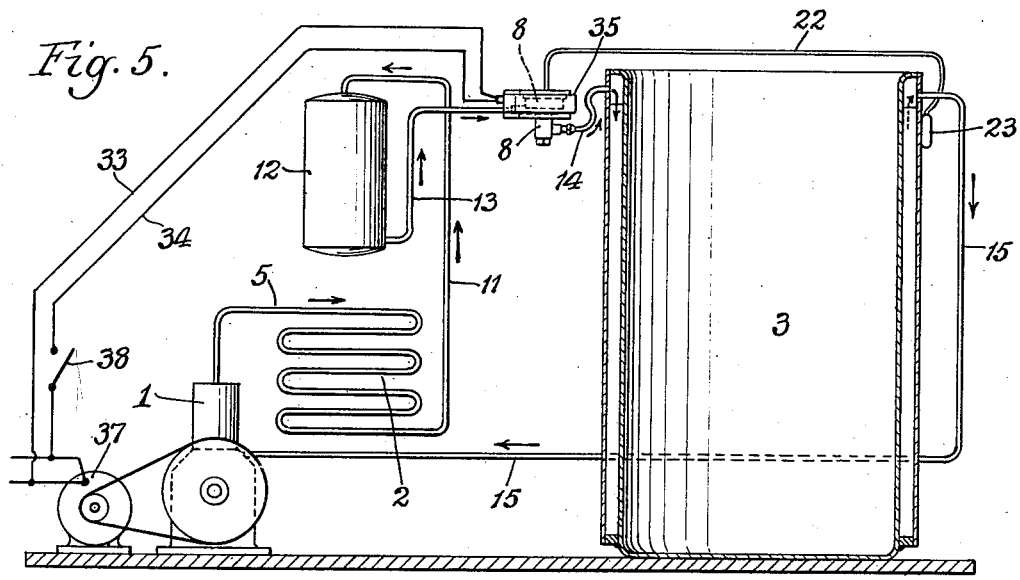
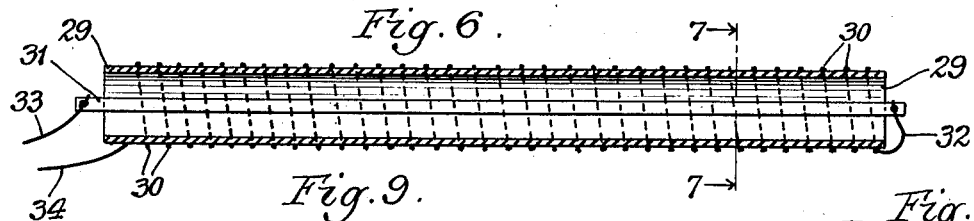
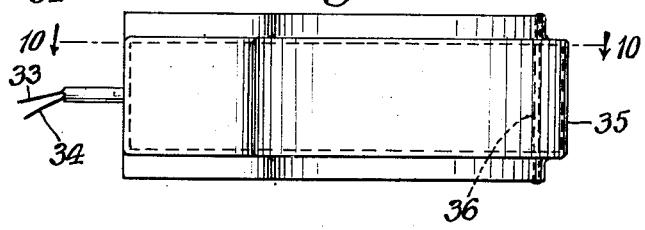
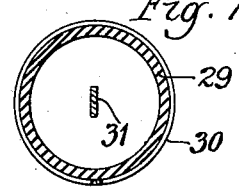
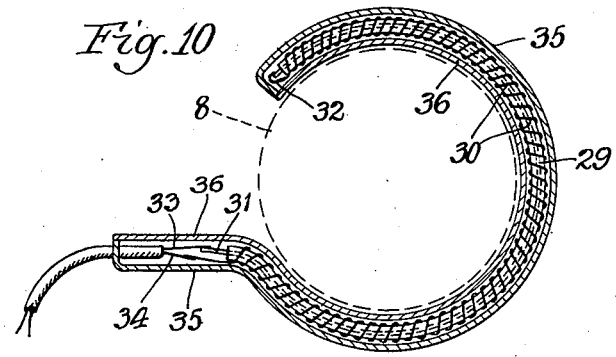
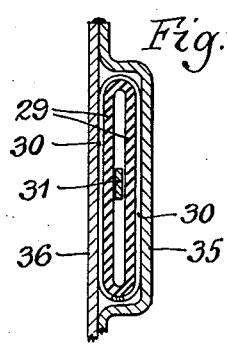
Inventor
Willard L. Morrison
by Parker & Carter
Attorneys.

Patented Dec. 18, 1945

2,391,030

UNITED STATES PATENT OFFICE 2,391,030

REFRIGERATING APPARATUS

Willard L. Morrison, Lake Forest, Ill.

Application December 15, 1941, Serial No. 423,023

6 Claims. (Cl. 62—127)

This invention relates to refrigerating apparatus and has for its object to provide a new and improved device of this description.

In refrigerating apparatus provided with an expansion valve there are certain difficulties which may arise to prevent proper operation of the system, requiring service calls to secure the proper operation of the apparatus. One of these most frequently met with is the chilling of the expansion valve. One of the objects of the present invention is to provide means for preventing the chilling of this expansion valve.

In refrigerating apparatus where the expansion valve is controlled by the temperature of the evaporator through the agency of a bulb, it often happens that in the non-operating phase of the cycle, the refrigerant is not moving but stationary so that the upper chamber of the expansion valve, with which the bulb is connected, becomes chilled to a temperature lower than that of the bulb and, as a consequence, the action of the valve is no longer controlled by the bulb. One of the objects of the present invention is to overcome this difficulty.

Again it often happens that there are minute quantities of moisture carried by the refrigerant to the expansion valve. As this moisture is chilled by the substantially instantaneous expansion in this valve of the refrigerant, this liquid tends to freeze into ice and clog the valve, and retard or prevent the further flow of refrigerant to the evaporator, thereby interfering with or stopping the refrigerating operation. The invention has as a further object to prevent this condition.

The invention has other objects which are more particularly pointed out in the accompanying description.

Referring now to the drawings,

Fig. 1 is a diagrammatic view showing one form of device embodying the invention;

Fig. 2 is a vertical sectional view through one form of expansion valve used in connection with the apparatus;

Fig. 3 is a plan view of the device shown in Fig. 2 with parts in section;

Fig. 4 is a side elevation of the heating device for the expansion valve;

Fig. 5 is a view similar to Fig. 1 showing a modified construction with a different heating device;

Fig. 6 is a view of the heating device before completion;

Fig. 7 is a sectional view taken on line 7—7 of Fig. 6;

Fig. 8 is a section through the heating device shown in Fig. 6 after it has been completed;

Fig. 9 is a view of the heating device separate from the valve;

Fig. 10 is a plan view with parts omitted of the heating device.

Like numerals refer to like parts throughout the several figures.

Referring now to Figs. 1 to 4 of the drawings, there is illustrated a refrigerating apparatus comprising a compressor 1, a condenser 2 and an evaporator 3. The compressor is operated by any suitable motor through the agency of the belt 4. The refrigerant passes from the compressor through the pipe 5 to the condenser 2. A portion of this refrigerant from the compressor passes through the pipe 6 to the heating element 7 associated with the expansion valve 8. This heating element consists of a receptacle 9 which, in this instance, surrounds a portion of the expansion valve. The pipe 6, through which some of the heated refrigerant from the compressor passes, discharges the heated refrigerant into the heating receptacle 9 and it passes around this heating receptacle and passes out through the pipe 10 and then passes up through the pipe 11 to the receiver 12.

The main portion of the refrigerant passes from the pipe 5 into the condenser 2 and up through pipe 11 into the receiver 12. The refrigerant then passes from the receiver 12 through the pipe 13 into the expansion valve 8 and then passes through the expansion valve when it is open and through the pipe 14 into the evaporator 3. The refrigerant then passes out of the evaporator 3 through the pipe 15 back to the compressor 1. The expansion valve is provided with a chamber 16 into which the refrigerant, passing from the receiver 12 through the pipe 13, enters.

There is a diaphragm 17 extending across this chamber, which contains refrigerant material. The refrigerant material in the chamber 16 passes down through a passageway 18 to a port 19 controlled by a valve 20, pressed against its seat by a spring 21. The bulb 23 is connected by a pipe 22 with the chamber 25. This bulb, the pipe and the chamber 25 above the diaphragm 17 contain preferably the same refrigerant material that is used in the evaporator. The bulb 23 is placed in proximity preferably to the warmest part of the evaporator. Under ordinary conditions, when the material in the bulb 23 becomes warm, it causes the pressure above the diaphragm 17 to be increased.

There is one member or are more actuating members 26 engaged by the diaphragm and which engages or engage the piston 27 to which the valve is connected. When the temperature rises to a predetermined point, the fluid in the bulb 23 expands and the pressure on the diaphragm 17 moves it and the actuating member or members 26 down so as to move the piston 27 downwardly. This moves the valve down so as to open the port 19 and permit the refrigerant to pass out into the pipe 14 and into the evaporator 3. The refrigerant then acts to reduce the temperature of the evaporator thereby reducing the temperature of the bulb 23. This causes the fluid therein to contract and decrease the pressure on the diaphragm 17, whereupon the spring 21 moves the parts back to their initial position, causing the valve 20 to close the port 19 and shut off the passage of the refrigerant to the evaporator.

In view of the fact that the variation in pressure in the chamber 25 is comparatively small, there is a spring 28 which acts in opposition to the spring 21 so that, by proper adjustment, a small increase in pressure in the chamber 25 will cause the valve 20 to be opened and a small decrease in pressure therein will cause the valve 20 to be closed.

The expansion valve 8 and the receptacle 9 may be supported in any desired manner. Ordinarily the expansion valve will be supported by the pipes connected to it and the receptacle 9 will be supported by the pipes and by the expansion valve.

The construction illustrated in Figs. 1 to 4 is particularly adapted for use when the refrigerating apparatus is being manufactured.

In Figs. 5 to 10 I have shown a construction particularly adapted for refrigerating apparatus already manufactured and out in the field. In this construction the heating of the expansion valve is accomplished electrically by means of a heating coil arranged in proximity to the expansion valve.

I have shown one effective method of making this heating coil. In this construction there is provided a tube 29 of insulating material, such as fibre. A heating coil 30 is wound around this tube (see Fig. 6). On the interior of the tube is placed a current conducting member 31. The end of the conductor 31 is connected in circuit with the coil 30 by the conductor 32. The coil and conducting member 31 are connected in the electric circuit by the conductors 33 and 34. The fibre tube is flattened as shown in Fig. 8 and is enclosed in a casing made of the members 35 and 36. This casing is preferably arranged to encircle the expansion valve as shown in Figs. 5 and 10.

The coil 30 is arranged to develop only a small amount of heat, just sufficient to insure the proper working of the expansion valve. In this construction the compressor will be usually operated by an electric motor 37 so that there will be current easily accessible and the conductors 33 and 34 will be connected with the conductors supplying this current. There is preferably a switch 38, by means of which the circuit can be controlled.

It will be seen that by means of this apparatus there is provided means for preventing the chilling of the expansion valve. The freezing of moisture in the expansion valve, which might otherwise interfere with its proper operation, is prevented.

I claim:

1. A refrigerating apparatus comprising an evaporator, a source of refrigerant supply connected with said evaporator, an expansion valve in said connection, a controlling means for controlling said expansion valve responsive to variations in temperature of the evaporator and means associated with the expansion valve for preventing the temperature thereof from falling below a predetermined point comprising an electric heating coil surrounding the exterior of the expansion valve and connected in an electric circuit.

2. A refrigerating apparatus comprising an evaporator, a source of refrigerant supply, a connection between said source of supply and said evaporator, an expansion valve in said connection, a controlling device for the expansion valve comprising a bulb in proximity to the evaporator and containing a refrigerant, a pipe leading from said bulb to the expansion valve and means associated with the expansion valve for preventing the temperature thereof from falling below a predetermined point, which would interfere with the proper operation of the expansion valve, said means comprising a resistance element surrounding the exterior of said expansion valve which limits the drop in temperature in the expansion valve to said predetermined point.

3. A refrigerating apparatus comprising an evaporator, a source of refrigerant supply, a connection between said source of refrigerant supply and said evaporator, an expansion valve in said connection, a controlling means for controlling said expansion valve responsive to variations in temperature of the evaporator and means associated with the expansion valve for preventing the temperature thereof from falling below a predetermined point, said means comprising a flattened tube of insulating material, an electric heating coil surrounding said flattened tube and an enclosing device surrounding said coil and flattened tube, the parts forming a circular shaped unit which surrounds the exterior of said expansion valve, and connections for connecting said heating coil in an electric circuit.

4. A refrigerating apparatus comprising an evaporator, a source of refrigerant supply connected with said evaporator, an expansion valve between said source of refrigerant supply and said evaporator, a controlling means for controlling said expansion valve responsive to variations in temperature of the evaporator and means associated with the expansion valve for preventing the temperature thereof from falling below a predetermined point, said last mentioned means including a resistance and means for passing current therethrough, said resistance including a portion extending circumferentially about the exterior of the expansion valve.

5. A refrigerating apparatus comprising an evaporator, a source of refrigerant supply connected with said evaporator, an expansion valve between said source of refrigerant supply and said evaporator, a controlling means for controlling said expansion valve responsive to variations in temperature of the evaporator and means associated with the expansion valve for preventing the temperature thereof from falling below a predetermined point, said last mentioned means including a heating shell substantially in the form of a cylinder extending circumferentially about the exterior of the expansion valve, and means for heating said shell.

6. A refrigerating apparatus comprising an evaporator, a source of refrigerant supply connected with said evaporator, an expansion valve between said source of refrigerant supply and said evaporator, a controlling means for controlling said expansion valve responsive to variations in temperature of the evaporator and means associated with the expansion valve for preventing the temperature thereof from falling below a predetermined point, said last mentioned means including a heating shell substantially in the form of a cylinder extending circumferentially about the exterior of the expansion valve, and means for heating said shell, including a resistance in said shell and an actuating electric circuit therefor.

WILLARD L. MORRISON.